No. 867,946. PATENTED OCT. 15, 1907.
J. CHAMNESS.
COTTON CHOPPER.
APPLICATION FILED FEB. 2, 1907.

2 SHEETS—SHEET 1.

Witnesses
C. K. Reichenbach.
F. G. Smith

Inventor
J. Chamness.
By
Attorneys.

No. 867,946.

PATENTED OCT. 15, 1907.

J. CHAMNESS.
COTTON CHOPPER.
APPLICATION FILED FEB. 2, 1907.

2 SHEETS—SHEET 2.

Witnesses
C. K. Reichenbach.
H. G. Smith

Inventor
J. Chamness.
By Chandler & Chandler
Attorneys.

UNITED STATES PATENT OFFICE.

JOSEPH CHAMNESS, OF GUTHRIE, OKLAHOMA TERRITORY.

COTTON-CHOPPER.

No. 867,946.　　　　Specification of Letters Patent.　　　Patented Oct. 15, 1907.

Application filed February 2, 1907. Serial No. 355,513.

*To all whom it may concern:*

Figure 1:
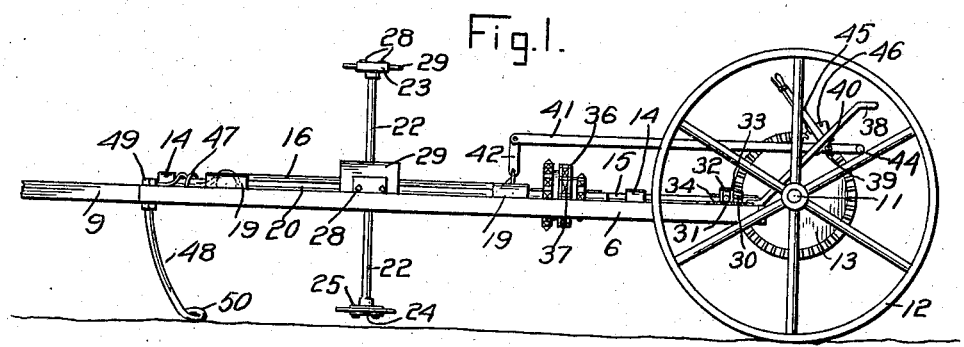
Figure 3:
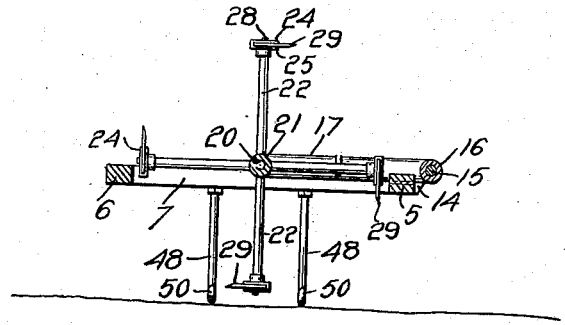
Figure 2:
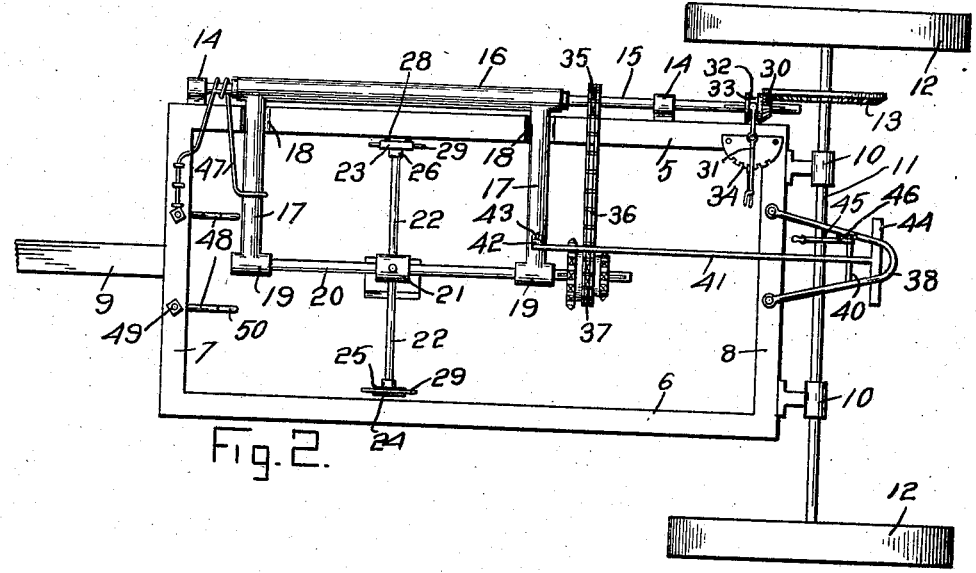
Figure 4:
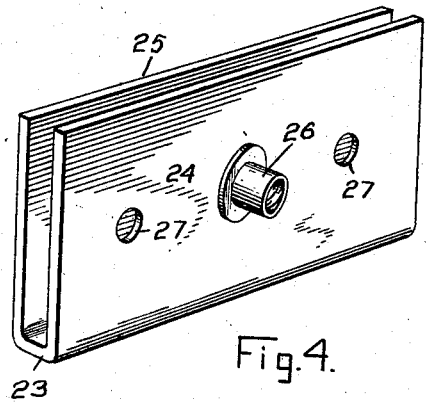

Be it known that I, JOSEPH CHAMNESS, a citizen of the United States, residing at Guthrie, in the county of Logan, Territory of Oklahoma, have invented certain new and useful Improvements in Cotton-Choppers; and I do hereby declare the following to be a full, clear, and exact description of the invention, such as will enable others skilled in the art to which it appertains to make and use the same.
This invention relates to cotton choppers and more particularly to that class including a rotary blade member and the primary object of the invention is to provide a machine of this class including means whereby the member may be raised out of operative position so that the machine may be turned in the field in which it is being used or may be drawn over under grown plants without acting upon the same. In my machine this chopping member is supported in such a manner that it may be swung upwardly and without interfering with any of the gearing.
　The further feature of my invention resides in the provision of ersilient guide members which are designed to travel one upon each side of the row of plants and enable the operator of the machine to properly guide the same.
　In the accompanying drawings, Figure 1 is a side elevation of a cotton chopper constructed in accordance with my invention, Fig. 2 is a top plan view, Fig. 3 is a detail vertical transverse sectional view, and, Fig. 4 is a detail view of blade holder.
　Referring more specifically to the drawings the machine is shown as comprising side sills 5 and 6 and front and rear and sills 7 and 8 respectively, these sills serving to form substantially a rectangular frame. A tongue 9 is connected with the front end sill 7.
　Rotatably journaled in suitable brackets 10 upon the rear end sill 8 and rearwardly thereof is an axle 11 carrying ground wheels 12 and a beveled gear 13. Bearing brackets 14 are secured to the side sill 5 and in these brackets is rotatably journaled a shaft 15 upon which is loosely disposed a sleeve 16 from which projects a pair of arms 17 which arms extend across the sill 5 toward the longitudinal middle of the machine and normally rest in recesses 18. At their outer ends, each of these arms is provided with a bearing 19 and in these bearings is journaled a shaft 20 upon which is arranged a hub 21 from which hub project radial arms 22. Each of these arms is provided at its outer ends with a blade receiving socket which comprises a plate bent upon itself at its middle as at 23 to form spaced portions 24 and 25, there being a threaded socket 26 formed upon the portion 24 for the reception of the outer end of the corresponding arm 22. Each of these sockets is moreover provided with openings 27 in its spaced portions for the passage of bolts 28 which bolts also pass through a blade 29 engaged between the members.
　In order that the shaft 15 may be rotated during the travel of a machine I have splined upon the shaft a beveled gear 30 which may be moved longitudinally upon the shaft and consequently into and out of gear with the beveled gear 13, this movement being accomplished by means of a lever 31 pivoted upon the sill 5 and having a yoke portion 32 which is loosely engaged between the collars 33 formed integral with the gear 30. This lever coöperates with a rack 34.
　A sprocket gear 35 is also arranged upon the shaft 15 and is connected by means of a sprocket chain 36 with a similar gear 37 upon the shaft 20 so that rotation of the shaft 15 will result in rotation of the said shaft 20 to operate the chopping mechanism.
　The seat standard for the machine comprises an inverted U-shaped member 38 which is secured at the end of the spaced portion to the end sill 8 and a short rock shaft 40 is mounted for rocking movement at its ends in suitable sockets 39 carried by these members an angle lever 41 being secured to the rock shaft 40 which extends both forwardly and rearwardly from said shaft and has pivotal connection at its forward end with the upper end of a link 42, the lower end of the link being pivotally connected as at 43 to one of the arms 17. At its extreme rear end this lever is provided with a foot bar 44 by means of which it may be rocked and secured to the shaft 40 is a hand lever 45 which may be used in addition to the foot bar when rocking the lever 41 and this lever 45 coöperates with a segmental rack 46 supported upon one of the members of the seat standard 38.
　From the foregoing description of my invention it will be readily understood that the sleeve 16, the arms 17, and the shaft 20 which carries the plate or chopping element, may be swung upwardly by movement of the lever 41 and the cutting apparatus thereby rendered inoperative.
　A spring 47 is coiled around the extreme forward end of the shaft 15 and is engaged at one of its ends with the forward arm 17 and secured at its other end to the forward end sill 7 this spring serves to normally hold the cutting elements in lowered position.
　Resilient rods 48 have their upper ends engaged through the forward end sill 7 one upon each side of the middle of the sill and are held in this position by means of nuts 49 which are engaged upon the rod above and below the sill. These rods are rearwardly inclined and extend downwardly to a point but slightly above the ground plane and have their lower ends bent rearwardly upon themselves as at 50 so as to readily pass over any obstructions and these rods are designed to pass one upon each side of the row of plants in the field to indicate to the operator of the machine whether or not the machine is traveling in a straight line or in other words in a direct line with the row.

What is claimed is—

1. A cotton chopper comprising a frame mounted for travel, a driven shaft carried by the frame, a shaft supported by the driven shaft, and a chopping device carried by the last mentioned shaft.

2. A cotton chopper comprising a frame mounted for travel, a driven shaft journaled upon the frame, a sleeve loosely carried by the shaft, a shaft supported from the sleeve and geared with the driven shaft, a chopping member carried by the last named shaft, and means for rocking the sleeve upon the driven shaft.

3. A cotton chopper comprising a frame arranged for travel, a driven shaft journaled upon the frame, a sleeve loosely engaged upon the driven shaft, arms carried by the sleeve, a chopper shaft journaled at the ends of the arms and geared with the driven shaft, and means connected with one of the arms whereby the arms and the sleeve together with the shaft supported thereby may be rocked.

4. A cotton chopper comprising a frame arranged for travel, a driven shaft journaled upon the frame, arms connected with the shaft for vertical rocking movement, a shaft journaled in the arms and geared with the driven shaft, a cutting device carried by the last named shaft, and means for swinging the arms.

In testimony whereof, I affix my signature, in presence of two witnesses.

JOSEPH CHAMNESS.

Witnesses:
WILLIAM M. PARTRIDGE,
P. JELSANE.